United States Patent
Ingalsbe et al.

(10) Patent No.: US 8,320,539 B2
(45) Date of Patent: Nov. 27, 2012

(54) ADVANCED PAYMENT FOR TELEPHONE SERVICES

(75) Inventors: Jason M. Ingalsbe, Rochester, NY (US); Stephen G. Kosarko, Victor, NY (US); Kenneth A. Pierce, Holyoke, MA (US); Mark R. Rissberger, North Chili, NY (US); Darren Smith, Victor, NY (US)

(73) Assignee: IDI Billing Solutions, Victor, NY (US)

( * ) Notice: Subject to any disclaimer, the term of this patent is extended or adjusted under 35 U.S.C. 154(b) by 1296 days.

(21) Appl. No.: 12/037,149

(22) Filed: Feb. 26, 2008

(65) Prior Publication Data

US 2009/0214012 A1   Aug. 27, 2009

(51) Int. Cl.
*H04M 15/00* (2006.01)
*H04B 1/38* (2006.01)
*G06Q 99/00* (2006.01)

(52) U.S. Cl. ............... 379/114.2; 235/379; 235/380; 235/381; 235/383; 379/88.19; 379/112.01; 379/144.01; 379/220.01; 379/355.03; 455/41.2; 455/405; 455/406; 455/414.1; 455/558; 705/14.49; 705/26.1; 705/26.41; 705/40; 705/412

(58) Field of Classification Search .............. 235/379, 235/380, 381, 383; 379/88.19, 114.2, 114.03, 379/144.01, 220.01, 112.01, 355.03; 455/41.2, 455/406, 414.1, 558, 405; 705/40, 412, 14.49, 705/26.1, 26.41, 41

See application file for complete search history.

(56) References Cited

U.S. PATENT DOCUMENTS

| | | | |
|---|---|---|---|
| 5,138,650 A | 8/1992 | Stahl et al. | |
| 5,898,768 A * | 4/1999 | Beyda et al. | 379/220.01 |
| 5,963,859 A | 10/1999 | Keating | |
| 5,991,748 A * | 11/1999 | Taskett | 705/41 |
| 5,995,822 A * | 11/1999 | Smith et al. | 455/406 |
| 6,101,378 A * | 8/2000 | Barabash et al. | 455/406 |
| 6,137,872 A * | 10/2000 | Davitt et al. | 379/114.2 |
| 6,226,364 B1 * | 5/2001 | O'Neil | 379/114.2 |
| 6,337,903 B1 * | 1/2002 | Manner | 379/144.01 |
| 6,526,273 B1 | 2/2003 | Link, II et al. | |
| 6,564,047 B1 * | 5/2003 | Steele et al. | 455/405 |
| 6,581,827 B2 * | 6/2003 | Welton | 235/380 |
| 6,745,022 B2 * | 6/2004 | Knox | 455/406 |
| 6,793,135 B1 * | 9/2004 | Ryoo | 235/383 |
| 6,856,674 B1 * | 2/2005 | De Trana et al. | 379/114.2 |
| 6,965,667 B2 | 11/2005 | Trabandt et al. | |
| 6,993,321 B1 | 1/2006 | Nilsson | |
| 7,013,125 B2 | 3/2006 | Henrikson et al. | |
| 7,043,011 B1 * | 5/2006 | Noble | 379/355.03 |
| 7,092,501 B2 * | 8/2006 | Maropis et al. | 379/114.2 |
| 7,120,419 B2 * | 10/2006 | Batni et al. | 455/406 |
| 7,131,582 B2 * | 11/2006 | Welton | 235/380 |
| 7,180,990 B1 * | 2/2007 | Henderson et al. | 379/114.2 |
| 7,255,268 B2 * | 8/2007 | Dentlinger | 235/380 |
| 7,257,207 B2 | 8/2007 | Ruckart et al. | |
| 7,331,521 B2 * | 2/2008 | Sorenson et al. | 235/381 |
| 7,413,117 B2 * | 8/2008 | Caven et al. | 235/379 |
| 7,519,325 B2 * | 4/2009 | Wakim | 455/41.2 |
| 7,613,657 B2 * | 11/2009 | Cesarini | 705/40 |

(Continued)

*Primary Examiner* — Gerald Gauthier
(74) *Attorney, Agent, or Firm* — Brian B. Shaw, Esq.; Harter Secrest & Emery LLP

(57) ABSTRACT

A method of providing telephone services includes receiving an advanced payment. The advanced payment corresponds to a fixed time interval of telephone service spanning at least one day. The method also includes activating service to a mobile device for the fixed time interval and collecting a plurality of call data.

33 Claims, 2 Drawing Sheets

U.S. PATENT DOCUMENTS

| | | | |
|---|---|---|---|
| 7,746,991 B2* | 6/2010 | Gil et al. | 379/114.2 |
| 7,773,735 B2* | 8/2010 | Rudolph | 379/114.2 |
| 7,783,326 B2* | 8/2010 | Abuhamdeh | 455/558 |
| 7,945,033 B2* | 5/2011 | Halford | 379/114.2 |
| 8,000,455 B1* | 8/2011 | Van Haaften et al. | 379/88.19 |
| 8,126,123 B2* | 2/2012 | Cai et al. | 379/114.03 |
| 8,140,052 B2* | 3/2012 | Linquist et al. | 455/406 |
| 8,213,585 B2* | 7/2012 | Wick | 379/114.2 |
| 2004/0107139 A1* | 6/2004 | Shibanuma | 705/14 |
| 2005/0079872 A1 | 4/2005 | Hutcheson et al. | |
| 2006/0078099 A1 | 4/2006 | Liebenow et al. | |
| 2006/0124732 A1* | 6/2006 | Dentlinger | 235/380 |
| 2006/0217106 A1* | 9/2006 | Davidson et al. | 455/405 |
| 2006/0251008 A1 | 11/2006 | Wu et al. | |
| 2007/0047703 A1* | 3/2007 | Paschini et al. | 379/112.01 |
| 2007/0123212 A1* | 5/2007 | Cesarini | 455/406 |
| 2007/0202845 A1 | 8/2007 | Hutcheson et al. | |
| 2007/0260562 A1* | 11/2007 | Hutson et al. | 705/412 |
| 2008/0262941 A1* | 10/2008 | Feiner et al. | 705/26 |
| 2009/0036106 A1* | 2/2009 | Guest et al. | 455/414.1 |
| 2009/0144167 A1* | 6/2009 | Calamera | 705/26 |
| 2009/0202054 A1* | 8/2009 | Wick | 379/114.2 |
| 2009/0214012 A1* | 8/2009 | Ingalsbe et al. | 379/114.2 |

* cited by examiner

ADVANCED PAYMENT FOR TELEPHONE SERVICES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

1. Field of the Invention

The present invention relates to a system and method for providing telephone services and, in particular, to a system and method for providing telephone services upon receipt of an advanced payment.

2. Description of Related Art

The use of wireless telephone services in the United States has grown steadily over the last few years as the offerings, services, and prices of wireless telephones and other wireless components have become more attractive. This evolution has brought service providers the opportunity to target new market segments not served by traditional telephone service business models. For example, credit challenged individuals often have difficulty meeting the credit score requirements that most service providers establish for traditional post-paid wireless services. Although such individuals have traditionally been ignored by service providers operating with a strictly post-paid business model, these individuals may represent a lucrative market segment when managed using a different business model. In addition, an increasing number of elderly people are now seeking the independence and sense of security that owning a cellular telephone can bring. However, unimpressed or even overwhelmed by all of the "bells and whistles" on the latest cellular telephones, unable to manage the small keypads available on many new telephones, and unwilling to sign long-term contracts or accept the uncertainty of a variable monthly bill, elderly users may be reluctant to obtain and use a cellular telephone. Moreover, typical post-paid telephone service plans often include a number of unknown fees, late payment charges, overage costs, and other budget breaking extras. Thus, for the budget-conscious consumer, wireless telephone service may not be a feasible option.

It is also true that in today's society, mobile telephone users are as transient and mobile as the phones themselves. Many individuals, for example, work in jobs that require spending weeks or months in one location before moving on to another location. For such mobile business people, it is often a challenge to find a single wireless telephone service provider and a single plan that accommodates their transitory lifestyle.

Similar difficulties often plague college students who typically spend nine months in their college location and then return home for the next three months of the year. For such college bound students, cost control and a lack of credit history can also make most existing post-paid wireless telephone service plans nearly impossible to secure or manage.

Finally, for families purchasing a cellular phone for a child, the desire to minimize the financial risks associated with the ownership of such a cell phone can be paramount. Safety is also a critical concern for parents of children using cellular phones. For example, parents may want to monitor whom their children are calling and how often such calls are being placed.

Accordingly, the disclosed systems and methods are directed towards overcoming one or more of the problems set forth above.

SUMMARY OF THE INVENTION

In an exemplary embodiment of the present disclosure, a method of providing telephone services includes receiving an advanced payment. The advanced payment corresponds to a fixed time interval of telephone service spanning at least one day. The method also includes activating service to a mobile device for the fixed time interval, and collecting a plurality of call data.

In another exemplary embodiment of the present disclosure, a method of providing telephone services includes collecting a plurality of user data from a user, associating a selected mobile device with the user based on the plurality of user data, and selecting a service plan based on the plurality of user data. The service plan includes a fixed time interval commitment spanning at least one day. The method also includes collecting an advanced payment from the user based on the fixed time interval and activating service to the mobile device for the fixed time interval.

In still another exemplary embodiment of the present disclosure, a method of providing telephone services includes collecting an advanced payment from a user corresponding to a fixed time interval spanning at least one day and activating service to a mobile device for the fixed time interval. The service enables the user to make and receive an unlimited number of local calls at no additional charge in excess of the collected advanced payment. The method also includes extending the service for an additional time interval spanning at least one day.

DETAILED DESCRIPTION OF THE DRAWINGS

Figure 1:
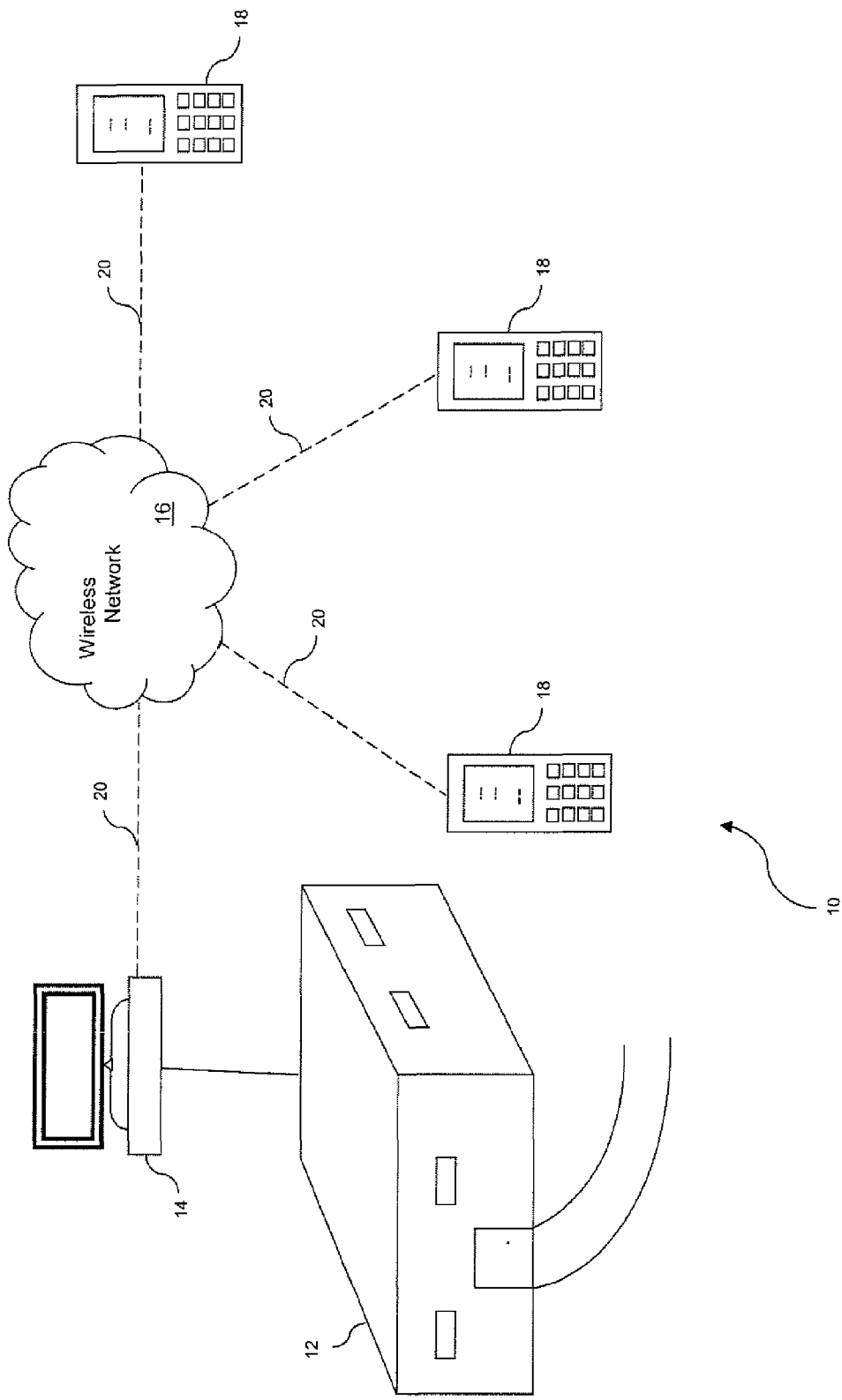
FIG. 1 is a diagrammatic illustration of a telephone service system according to an exemplary embodiment of the present disclosure.

FIG. 1 illustrates a telephone service system 10 according to an exemplary embodiment of the present disclosure. As shown in FIG. 1, the system 10 may include, for example, a server 14 connected to a wireless network 16. The system 10 may also include one or more mobile devices 18 connected to the wireless network 16. One or more components of the system 10 may be housed in and/or otherwise located within a sale center 12. For example, the server 14 may be located within the sale center 12 and may be connected to the wireless network 16 via one or more connections 20.

The sale center 12 may be, for example, any type of retail store known in the art, such as a brick and mortar retail store. The sale center 12 may also be, for example, a store front accessible by wireless telephone service customers, a kiosk located within a shopping mall, a stand-alone shopping facility, and/or any other known retail facility. In addition, the sale center 12 may be a call center, a website operated by the service provider, and/or any other conventional point of sale known in the art. In an exemplary embodiment of the present disclosure, telephone service customers or users may be required to visit the sale center 12 to, for example, select equipment for use, select service plans and/or add-on features, make advanced payments, receive wireless equipment, activate their telephone service, replenish their service, and/or otherwise make any transactions necessary for the activation or replenishment of such features and/or services.

It is understood that the embodiment of the sale center 12 utilized by the service provider may be dependent upon various factors including, but not limited to, the service provider's business model. For example, the service provider's business model may be such that customers are required to visit a brick and mortar sale center 12 in-person to select a mobile device 18, make an advance payment, and/or otherwise activate their service. However, once the customer's service has been hotlined (hotlining will be discussed in greater detail below), the service provider may allow the customer to replenish their service via credit card by either calling a service provider customer service department or by visiting a service provider website. In such an exemplary embodiment, the sale center 12 may include the brick and mortar sale center, the customer service department, and the website.

The server 14 can comprise, for example, an electronic control unit, a computer, and/or any other electrical control device known in the art. The server 14 can include one or more operator interfaces such as, for example, a monitor, a keyboard, a mouse, a touch-screen, and/or any other devices useful in entering, reading, storing, and/or extracting data from a human user or from one or more devices to which the server 14 is connected. The server 14 can also be configured to store and/or manipulate data regarding, for example, telephone services, users, or customers, as well as data collected from the user or from the mobile device 18 associated with the user. Such data can be useful in performing analysis on the user's call activity such as, for example, trending analysis and/or other marketing related analysis. In an exemplary embodiment, such data can be useful in forming a user profile. In such an exemplary embodiment, the data collected can include, for example, a call log identifying who was called by the user, who placed calls to the user, when calls were placed by the user, when calls were received by the user (i.e., the time of day), the duration of each telephone call, and/or the number of calls placed and/or received by the mobile device 18. Such data can, for example, be stored by one or more memory devices of the server 14 and can be manipulated by the server 14 as desired.

As shown in FIG. 1, the server 14 can be connected to the wireless network 16 via one or more connections 20. The connections 20 can consist of any conventional electrical and/or communication means known in the art such as, for example, wires or other like connection structures, as well as wireless communication means. The connections 20 may provide users with a variety of options for communication. For example, the connections 20 may be configured to transmit and receive multimedia communications including, for example, audio, voice, video, text, imaging, and all other types of data. Such data can be transmitted between the wireless network 16 and the server 14 and may also be transmitted between the wireless network 16 and the mobile device 18.

The wireless network 16 may comprise, for example, one or more data networks such as, the internet, and/or public telephone networks including wireless networks. In an exemplary embodiment, the wireless network 16 may comprise an internet protocol ("IP") network, including a data link. In such an exemplary embodiment, the system 10 may include one or more data links (not shown) configured to implement a packet-based protocol for the transfer of data to one or more data networks. In such an exemplary embodiment, the data link and IP network can provide access to any elements connected thereto, such as, for example, additional servers (not shown), media gateways, public switched telephone networks, and/or other known communications links. For example, a media gateway associated with the wireless network 16 may be coupled to a public-switched telephone network via a communications link, and such a media gateway may be configured to convert packetized voice information to a circuit-switched protocol acceptable to a public-switched telephone network. In an additional exemplary embodiment, a media gateway associated with the wireless network 16 can be configured to convert circuit-switched communications received from a public-switched telephone network to packetized communications data acceptable to other components of the wireless network 16. In such exemplary embodiments, the intermediate gateways, data links, and communication links, of the wireless network 16 may provide an interface for and/or access to one or more public-switched telephone networks. By virtue of such a connection, a user of the system 10, may be able to access elements connected to the public-switched telephone networks such as, for example, other mobile devices 18 and/or land-line based telephones.

The mobile devices 18 shown in FIG. 1 can include, for example, cellular telephones, hand-held computers, personal data organizers, and/or any other mobile devices known in the art. In an exemplary embodiment, the mobile devices 18 may comprise cellular telephones configured for use in an advanced pay usage scheme or business model. The mobile devices 18 may be configured to receive and/or transmit any kind of communications data known in the art such as, for example, audio, voice, video, text, imaging, and/or other types of data. The mobile devices 18 may be configured to send and receive, for example, text messages, email, digital images, voice communications, and/or any other electrical or digital information known in the art. Such mobile devices 18 may be produced by any known mobile device manufacturer and may be electrically, wirelessly, and/or otherwise connectible to the wireless network 16.

It is understood that the exemplary system 10 illustrated in FIG. 1 may include additional components configured to facilitate wireless, electrical, and/or other connections between, for example, the mobile devices 18, the wireless network 16, and the server 14. Such components may include any electrical, telecommunications, and/or other components known in the art.

INDUSTRIAL APPLICABILITY

Telephone services facilitated and/or otherwise provided by the exemplary telephone service system 10 of the present disclosure can be purchased at a sale center 12 and activated on the spot. In an exemplary embodiment, a customer or potential user may visit the sale center 12, and may elect to purchase a mobile device 18 and any associated mobile telephone services or add-on features. Alternatively, upon visiting the sale center 12, the user may simply activate such telephone services on an existing mobile device 18 already owned by the user. The telephone service system 10 can be configured such that telephone services can be purchased for a fixed time interval rather than being based on the consumption of minutes. The fixed time interval of telephone service may span, for example, at least one day and in an exemplary embodiment, can span one or more months. When the fixed time interval of purchased telephone services expires, the mobile device 18 can be "hotlined" at which time the user may be required to return to the sale center 12 to purchase a new fixed time interval of service. As will be discussed in further detail below, it is understood that hotlining may include, for example, suspending service at the end of the fixed time interval of telephone service until a specified time period elapses. At the end of the specified time period, a determination may be made as to whether or not the telephone services provided should be permanently disconnected.

As discussed above, the sale center 12 illustrated in FIG. 1 may be, for example, a retail location operated by a telephone or wireless communication service provider. In an exemplary embodiment, recharges and/or top-offs of the fixed time interval of telephone services may not be conducted via telephone cards, but instead, may be managed at the sale center 12 or, alternatively, via a telephone call to a customer service representative associated with the sale center 12.

In addition, in order to activate telephone services to the mobile device 18 for the fixed time interval, the service provider may require receipt of an advanced payment from the user. The advanced payment may correspond to the fixed time interval of telephone services requested by the user. Because the user purchases the fixed interval of telephone services through an advanced payment, the user may not receive, for example, a monthly invoice for the telephone services provided by the service provider. The service provider, however, may still process and rate each of the calls placed by the user such that a user profile may be created based on the collected and/or recorded call data. As used herein, "rating" a call may be a process by which the cost of the call to the end user is determined, and a call may be rated based on call duration, call origination location, call termination location, time of day the call was placed, and/or other known factors.

The collected call data may be utilized for trending and/or other known analysis. It is understood that the telephone service system 10 and methods of providing telephone services described herein are not tied to a particular platform or service provider, and the telephone service system 10 may be compatible and/or otherwise useable with, for example, GSM and CDMA/TDMA technologies.

Figure 2:
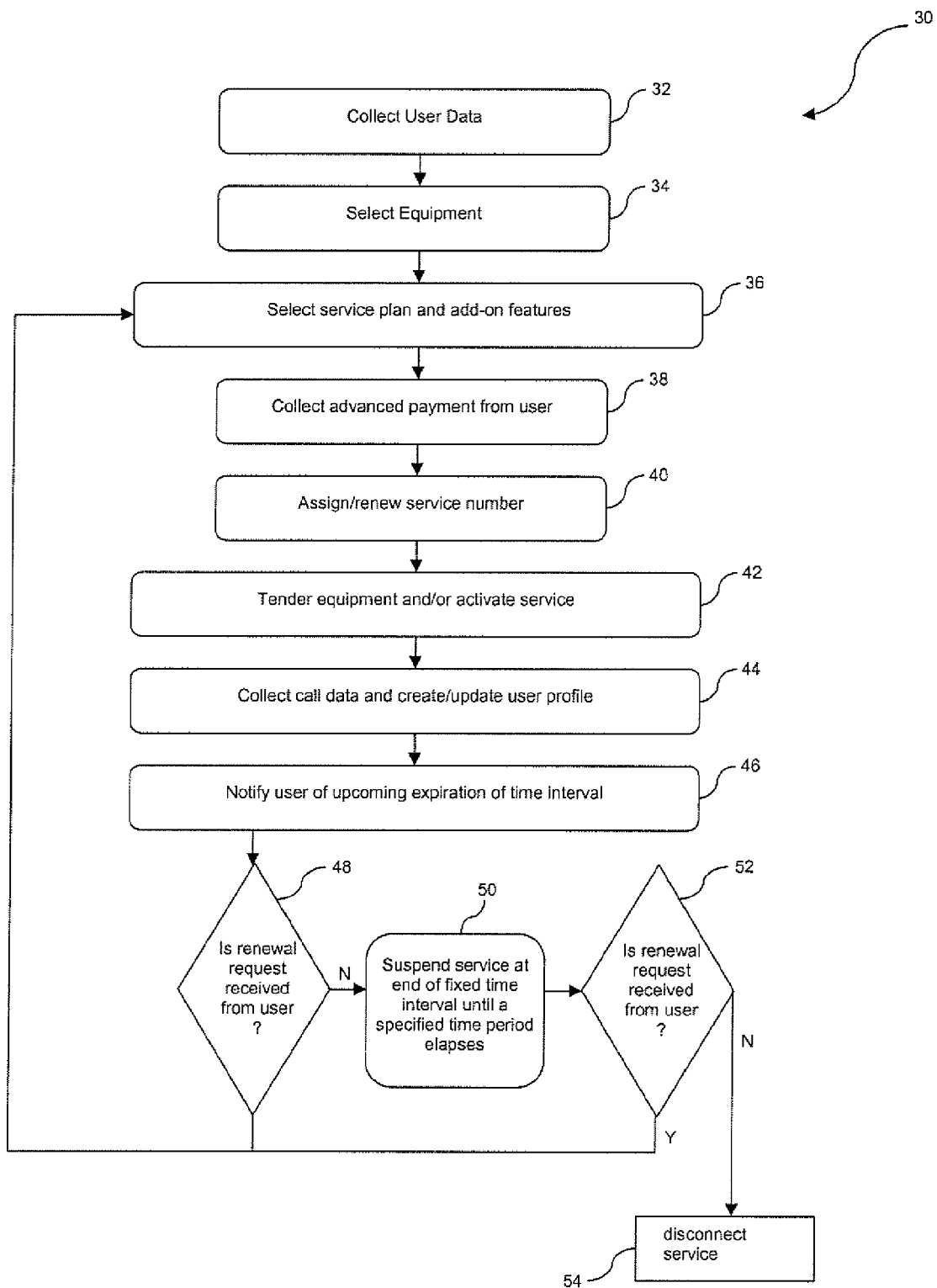
FIG. 2 is a flow chart illustrating a method of providing telephone services according to an exemplary embodiment of the present disclosure.

FIG. 2 depicts a flow chart 30 illustrating a method of providing telephone services according to an exemplary embodiment of the present disclosure. As shown in FIG. 2, a customer care and/or sales representative of a wireless telephone service provider may collect user data (Step 32) at the sale center 12. The plurality of user data can include, for example, personal account information and/or a set of user preferences. The user data collected may be, for example, address, social security number, age, personal identification, and/or any other information commonly collected by service providers at the outset of registering a new customer with the service provider and/or renewing an existing user or customer account. The set of user preferences may include, for example, information pertinent to the functions and/or capabilities of the mobile device 18 desired by the user. Such user data may assist the customer care representative in suggesting mobile devices 18 or other equipment for use by the user.

Once the user data has been collected, the customer care representative may assist the user in selecting equipment (Step 34) and such equipment may include a mobile device 18 best suited for the user's needs and/or preferences. Such equipment may also include, for example, hands-free devices, mobile device holsters, and/or any other peripheral devices known in the art. For example, an elderly user may desire a mobile device 18 that is relatively easy to use and that does not have many confusing buttons, features, or function menus. On the other hand, a user who is familiar with such functionality may desire a mobile device 18 having such features.

Once the appropriate equipment has been selected, the customer care representative may assist the user in selecting a service plan and/or add-on features associated with the selected equipment and/or service plan (Step 36). In an exemplary embodiment, the service provider may offer a variety of service plans and each of the service plans may be tailored and/or best suited for users with different needs or requirements. For example, business men and women may desire a service plan that provides them with wireless telephone service in a particular location only while they are traveling on site at that particular location. Once their work in that particular location is completed, the business user may want to take their mobile device 18 to a next business location and sign up for telephone services on an "as needed" basis at the next location. Such exemplary users may prefer a service plan that enables them to own the mobile device 18 and to take the mobile device 18 with them when they transition from location to location while only paying for wireless telephone services as needed.

As an additional example, for families purchasing a mobile device 18 for a teen, security is often a major concern. For example, parents may want to minimize the financial and safety risks associated with owning and using a mobile device while, at the same time, assisting their child in experiencing the responsibilities associated with such a device. For such users, add-on features such as, for example, optional invoicing may provide parents with the ability to monitor who their children are communicating with and how often such communications occur. Other add-on features may include, for example, call waiting, voice mail, SMS, picture sharing, data sharing, text messaging, camera functionality, internet access, and/or any other add-on features or functionality known in the art.

Once the service plan and any associated add-on features have been selected, the customer care representative at the sale center 12 may collect an advanced payment from the user (Step 38). As discussed above, the advanced payment may be for a fixed time interval of telephone service spanning at least one day. The advanced payment may be made by any known monetary means such as, for example, cash, check, and/or credit card. The collection of the advanced payment from the user in Step 38 and the collection of user data in Step 32 may be performed by the customer care representative with or without performing a credit check of the user. In addition, the step of collecting the advanced payment from the user (Step 38) may also include collecting any and all applicable telecommunication taxes in advance, and collecting any and all applicable billing taxes related to monthly recurring charges.

As shown in FIG. 2, once the advanced payment has been collected, the customer care representative may assign a new unique service number to the customer or, alternatively, if the user is an existing or prior customer of the service provider, the customer care representative may simply renew an existing service number already associated with the user (Step 40). In an exemplary embodiment, the service number may be a telephone number associated with the mobile device 18 and/or with the user. In an additional exemplary embodiment, the service number assigned in Step 40 may be any other identification number useful in tracking the user and/or identifying the user profile associated with the user. The customer care representative may then tender the selected equipment to the user and/or activate the telephone services (Step 42). As discussed above, the telephone services discussed herein may be activated at the time of purchase of the mobile device 18 and/or the service plan discussed with respect to Step 36. It is also understood that in an exemplary embodiment of the methods discussed herein in which the user already owns his/her own mobile device 18, Step 42 may not include the tendering of any equipment to the user. In an exemplary embodiment, the telephone services may be "active" relative only to the duration of the fixed time interval of telephone services paid for in advance.

It is understood that, as a result of the advanced payment discussed above with respect to Step 38, the user may own the mobile device 18 once the equipment has been tendered and/or the telephone services have been activated (Step 42). The telephone services can include, for example, enabling the user to make and receive an unlimited number of local calls at no additional charge in excess of the collected advanced payment. Although not shown in FIG. 2, the telephone service provider may also make available and/or otherwise offer a loyalty discount to the user based on the activation of service and/or registration of the user for a predetermined number of consecutive fixed time intervals. In such an exemplary embodiment, the telephone service provider may also offer a loyalty discount to a user following a gap in telephone service. In this way, users may not be penalized for having "gaps" in their telephone service.

As shown in Step 44, once the services have been activated, the service provider may collect a plurality of call data and may create and/or update an existing user profile associated with the user (Step 44). As discussed above, the collected call data can include, for example, a log or listing of calls placed by the user, of calls received by the user, and the duration of calls placed and received by the user. The call data can also include the time of day in which the calls were placed and/or received and can further include the number of calls placed and/or received by the user. Call data can also include any other data or call information known in the art and the collected call data can be utilized in the formation of the user profile. In an exemplary embodiment, the call data can be stored in the server 14 (FIG. 1) and the call data can be manipulated in any means known in the art. Such manipulations can include, for example, performing one or more trending analysis based on the plurality of collected call data. The collected call data and manipulations thereof can be used, for example, to assist in the performance of marketing and/or sales research by the service provider. The call data can also be used to assist in rating calls and for fraud detection purposes. In an exemplary embodiment, data such as an overabundance of expensive calls to a particular location, a spike in a the number of minutes used, and/or other data may be used in detecting when a telephone has been stolen and/or other fraudulent behavior.

It is understood that such call data can be collected and/or transferred from the mobile device 18 to the server 14 via the connections 20 (FIG. 1). The collection of call data may be an automatic function performed by the server 14 and the collection of such call data can occur without any interaction between, for example, the user and the mobile device 18.

As shown in Step 46, as the user approaches the end of the fixed time interval of telephone service, the server 14 and/or other components of the telephone service system 10 (FIG. 1) may notify the user at, for example, a predetermined time prior to the expiration of the fixed time interval, of the upcoming expiration (Step 46). Such a notification can include, for example, a text message sent from the server 14, via the wireless network 16, to the mobile device 18. Such a notification can also include, for example, a voice mail message sent to the mobile device 18 and/or any other electronic notifications known in the art. As the user gets closer to the expiration of the fixed time interval of telephone services, the user may have the option of renewing the fixed time interval associated with the telephone services. In an exemplary embodiment, in order to renew the fixed time interval with the service provider, the user may be required to visit the sale center 12 of the service provider to, for example, submit an additional advanced payment for the telephone services desired.

As the expiration of the fixed time interval approaches, the service provider may determine whether a renewal request has been received from the user (Step 48). If a renewal request has not been received from the user, the service provider may hotline the user's telephone services once the fixed time interval has expired. Once the service has been hotlined, the user's service number may remain active for a specified period of time, however the service provider may suspend service to the user's mobile device 18 until the specified time period has elapsed (Step 50) or until the user has renewed the telephone services by making another advanced payment. The telephone services can be renewed at any time using the steps outlined above.

If, however, the service has been hotlined and the specified time period for hotlining has elapsed, the service provider may determine whether an additional renewal request has been received from the user (Step 52). If no such renewal request has been received, the service provider may disconnect service to the mobile device 18 (Step 54). As discussed above, if a renewal request has been received from the user either at Step 48 or at Step 52, the service plan can once again be selected along with any add-on features desired by the user, and service to the mobile device 18 can be renewed by the service provider.

In an exemplary embodiment, any additional fixed time interval purchased by the user can be variable in duration. As used herein, a "variable" fixed time interval may constitute multiple fixed intervals of telephone service from the service provider. For example, instead of purchasing a single one-week time interval (a fixed time interval), a user may purchase two or more one-week time intervals at the same time (a variable fixed time interval). It is also understood that at least one additional add-on feature can be activated for the additional fixed time interval. In renewing the telephone services provided by the service provider, the user may be required to return to the sale center 12 (FIG. 1) to recharge and/or otherwise renew the desired services. Alternatively, the user may be required to call the customer service department associated with the service provider in order to renew such services. In addition, in an exemplary embodiment, the user can be converted to a post-paid customer based on, for example, the plurality of user data collected at Step 32. The conversion of the user from an advanced payment customer to a post-paid customer may be based on a number of factors including, for example, the user's payment history, the usage of the mobile device 18 by the user over the span of the fixed time interval, and/or any of the collected call data or analysis performed therewith.

Other embodiments of the disclosed system 10 will be apparent to those skilled in the art from consideration of this specification. It is intended that the specification and examples be considered as exemplary only, with the true scope of the invention being indicated by the following claims.

ITEM LIST

10—telephone service system
12—sale center
14—server
16—wireless network
18—mobile devices
20—connections
30—flow chart
32—Step: collect user data
34—Step: select equipment
36—Step: select service plan and add-on features
38—Step: collect advanced payment from user
40—Step: assign/renew service number
42—Step: tender equipment and/or activate service
44—Step: collect call data and create/update user profile
46—Step: notify user of upcoming expiration of time interval
48—Step: is renewal request received from user?
50—Step: suspend service at end of fixed time interval until a specified time period elapses
52—Step: is renewal request received from user?
54—Step: disconnect service

What is claimed is:

1. A method of providing telephone services, comprising:
receiving an advanced payment, the advanced payment corresponding to a fixed time interval of telephone service spanning at least one day, the telephone service including at least one of making and sending an unlimited number of locals calls within the fixed time interval;
activating service to a mobile device from a provider based on the advanced payment for the fixed time interval; and
collecting a plurality of call data corresponding to the mobile device.

2. The method of claim 1, further comprising performing a trending analysis based on the plurality of call data.

3. The method of claim 1, further comprising one of suspending and disconnecting the telephone service after an expiration of the fixed time interval in response to a failure of a user to purchase an additional time interval.

4. The method of claim 1, further including extending the telephone service for an additional time interval.

5. The method of claim 1, further including notifying a user, at a predetermined time prior to an expiration of the fixed time interval, of the upcoming expiration.

6. The method of claim 1, wherein the plurality of call data comprises a call log.

7. The method of claim 1, wherein the advanced payment includes applicable telecommunication taxes.

8. The method of claim 1, further comprising converting a user to a post-paid customer based on a plurality of user data.

9. The method of claim 1, further including requiring a user to purchase the telephone service at a brick and mortar retail store.

10. The method of claim 1, wherein the telephone service is automatically activated upon receipt of the advanced payment.

11. The method of claim 1, wherein the mobile device is a pre-owned device.

12. The method of claim 4, wherein extending the telephone service comprises requiring a user to make an additional advanced payment at a brick and mortar retail store.

13. The method of claim 1, further including creating a user profile based on the plurality of call data.

14. The method of claim 13, wherein the user profile includes at least one of a listing of calls placed by a user, a listing of calls received by the user, a listing of call times, and a listing of call durations.

15. The method of claim 1, further including requiring a user to purchase the mobile device prior to activating the telephone service.

16. A method of providing telephone services, comprising:
collecting a plurality of user data from a user;
associating a selected mobile device with the user based on the plurality of user data;
selecting a service plan based on the plurality of user data, the service plan comprising a fixed time interval commitment spanning at least one day, wherein the service plan includes at least one of making and sending an unlimited number of locals calls within the fixed time interval;
collecting an advanced payment from the user based on the fixed time interval; and
activating service to the mobile device from a provider based on the advanced payment for the fixed time interval.

17. The method of claim 16, wherein the plurality of user data comprises at least one of personal account information and a set of user preferences.

18. The method of claim 16, further including adding at least one add-on feature to the service plan.

19. The method of claim 18, wherein the at least one add-on feature comprises one of voicemail, SMS, picture sharing, and data sharing.

20. The method of claim 16, wherein the advanced payment comprises monthly recurring charges and telecommunication taxes corresponding to the service plan.

21. The method of claim 16, further including collecting a plurality of call data.

22. The method of claim 21, further including performing a trending analysis based on at least one of the user data and the call data.

23. The method of claim 16, further comprising one of suspending and disconnecting the service plan at an expiration of the fixed time interval in response to a failure of a user to purchase an additional time interval.

24. The method of claim 16, further comprising extending the service plan for an additional time interval.

25. The method of claim 24, wherein the additional time interval is variable.

26. The method of claim 25, further including activating at least one add-on feature for the additional time interval.

27. The method of claim 16, further including generating an optional invoice.

28. The method of claim 16, further including offering a loyalty discount to the user based on registration for a predetermined number of consecutive fixed time intervals.

29. A method of providing telephone services, comprising:
collecting an advanced payment from a user corresponding to a fixed time interval spanning at least one day; and
activating service to a mobile device from a provider based on the advanced payment for the fixed time interval, the service enabling the user to make and receive an unlimited number of local calls at no additional charge in excess of the collected advanced payment.

30. The method of claim 29, wherein activating service to the mobile device includes activating at least one add-on feature.

31. The method of claim 29, further including collecting a plurality of call data.

32. The method of claim 29, further comprising extending the service for an additional time interval spanning at least one day.

33. The method of claim 32, wherein the additional time interval is one of a plurality of available intervals.

* * * * *